United States Patent
Aamir et al.

(10) Patent No.: US 9,344,422 B2
(45) Date of Patent: May 17, 2016

(54) METHOD TO MODIFY ANDROID APPLICATION LIFE CYCLE TO CONTROL ITS EXECUTION IN A CONTAINERIZED WORKSPACE ENVIRONMENT

(71) Applicant: Oracle International Corporation, Redwood Shores, CA (US)

(72) Inventors: Mohammad Aamir, San Jose, CA (US); Atta Ur Rehman, Cambridge (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/594,377

(22) Filed: Jan. 12, 2015

(65) Prior Publication Data

US 2016/0087953 A1 Mar. 24, 2016

Related U.S. Application Data

(60) Provisional application No. 62/054,853, filed on Sep. 24, 2014.

(51) Int. Cl.
*G06F 21/52* (2013.01)
*H04L 29/06* (2006.01)

(52) U.S. Cl.
CPC ............... *H04L 63/08* (2013.01); *H04L 63/20* (2013.01)

(58) Field of Classification Search
CPC ............................. H04L 63/20; H04L 63/08
USPC ............................................ 726/1, 2, 22, 26
See application file for complete search history.

(56) References Cited

U.S. PATENT DOCUMENTS

| | | | |
|---|---|---|---|
| 5,892,904 A | 4/1999 | Atkinson et al. | |
| 5,923,756 A | 7/1999 | Shambroom | |
| 6,052,739 A * | 4/2000 | Bopardikar | G06F 9/4812 710/266 |
| 6,151,606 A | 11/2000 | Mendez | |
| 6,226,618 B1 | 5/2001 | Downs et al. | |
| 6,317,868 B1 | 11/2001 | Grimm et al. | |
| 6,324,648 B1 | 11/2001 | Grantges, Jr. | |
| 6,484,276 B1 * | 11/2002 | Singh | G06F 11/263 714/38.13 |
| 6,735,763 B1 | 5/2004 | Enokida | |
| 6,993,137 B2 | 1/2006 | Fransdonk | |
| 6,996,808 B1 * | 2/2006 | Niewiadomski | G06F 9/4426 712/E9.083 |

(Continued)

FOREIGN PATENT DOCUMENTS

| EP | 0 474 131 A2 | 3/1992 |
|---|---|---|
| EP | 1122640 A1 | 8/2001 |

(Continued)

OTHER PUBLICATIONS

International Search Report and Written Opinion, Mar. 24, 2015, PCT application No. PCT/US2015/011136, 12 pages.

(Continued)

*Primary Examiner* — Haresh N Patel
(74) *Attorney, Agent, or Firm* — Kilpatrick Townsend & Stockton LLP

(57) ABSTRACT

Methods, devices, and systems are described to modify the life cycle of a Google Android® application, in its application manifest file and byte code, such that the execution of the application can be controlled via policies and security governed by a workspace application installed on an Android-based device. Dummy wrapper classes are inserted into the byte code for network and I/O system calls that call security code before calling the original classes.

20 Claims, 7 Drawing Sheets

(56) References Cited

U.S. PATENT DOCUMENTS

| | | | |
|---|---|---|---|
| 7,159,120 B2 | 1/2007 | Muratov | |
| 7,184,801 B2 | 2/2007 | Farcasiu | |
| 7,243,163 B1 | 7/2007 | Friend et al. | |
| 7,275,073 B2 | 9/2007 | Ganji et al. | |
| 7,447,799 B2 | 11/2008 | Kushner | |
| 7,596,565 B2 | 9/2009 | Friend et al. | |
| 7,620,001 B2 | 11/2009 | Ganji | |
| 7,620,392 B1 | 11/2009 | Maurya et al. | |
| 7,702,322 B1 | 4/2010 | Maurya et al. | |
| 7,788,382 B1 | 8/2010 | Jones et al. | |
| 7,849,451 B2 | 12/2010 | Palacz et al. | |
| 7,886,148 B2 | 2/2011 | Kiriansky et al. | |
| 7,920,631 B2* | 4/2011 | Vicars-Harris | H04N 19/85 375/240.03 |
| 8,001,082 B1 | 8/2011 | Muratov | |
| 8,284,933 B2 | 10/2012 | Chaisson et al. | |
| 8,549,656 B2 | 10/2013 | Blaisdell et al. | |
| 8,584,118 B2 | 11/2013 | Kotamarthi et al. | |
| 8,595,841 B2 | 11/2013 | Britton et al. | |
| 2001/0047365 A1* | 11/2001 | Yonaitis | G06F 17/30896 |
| 2001/0047510 A1* | 11/2001 | Angel | G06F 11/3612 717/128 |
| 2002/0073402 A1* | 6/2002 | Sangavarapu | G06F 11/362 717/129 |
| 2002/0169954 A1 | 11/2002 | Bandini et al. | |
| 2003/0182460 A1* | 9/2003 | Khare | G06F 9/547 719/310 |
| 2004/0006630 A1 | 1/2004 | Friend et al. | |
| 2004/0117310 A1 | 6/2004 | Mendez et al. | |
| 2004/0163088 A1 | 8/2004 | Fender et al. | |
| 2004/0172640 A1* | 9/2004 | Luo | G06F 9/4433 719/328 |
| 2004/0224675 A1 | 11/2004 | Puskoor et al. | |
| 2005/0033983 A1* | 2/2005 | Takekawa | G06F 21/31 726/2 |
| 2005/0039186 A1 | 2/2005 | Borkan | |
| 2005/0154886 A1 | 7/2005 | Birk et al. | |
| 2005/0240943 A1 | 10/2005 | Smith et al. | |
| 2006/0190934 A1* | 8/2006 | Kielstra | G06F 9/45516 717/148 |
| 2006/0277408 A1 | 12/2006 | Bhat et al. | |
| 2007/0157134 A1* | 7/2007 | Cheng | G06F 17/5022 716/103 |
| 2007/0234408 A1 | 10/2007 | Burch et al. | |
| 2007/0250539 A1* | 10/2007 | Montgomery | G06Q 10/06 |
| 2008/0037593 A1 | 2/2008 | Friedman et al. | |
| 2008/0060080 A1 | 3/2008 | Lim | |
| 2008/0289019 A1 | 11/2008 | Lam | |
| 2008/0292103 A1 | 11/2008 | Lee et al. | |
| 2008/0320566 A1 | 12/2008 | Herzog et al. | |
| 2009/0222792 A1 | 9/2009 | Shanbhogue et al. | |
| 2009/0228716 A1* | 9/2009 | Poston | G06F 21/6209 713/189 |
| 2009/0288143 A1 | 11/2009 | Stebila et al. | |
| 2009/0300656 A1 | 12/2009 | Bosworth et al. | |
| 2009/0307191 A1 | 12/2009 | Li et al. | |
| 2010/0042396 A1* | 2/2010 | Cassani | G06F 11/263 703/13 |
| 2010/0057845 A1 | 3/2010 | Thomas et al. | |
| 2010/0174974 A1 | 7/2010 | Brisebois et al. | |
| 2010/0212028 A1 | 8/2010 | Eriksson et al. | |
| 2011/0047451 A1 | 2/2011 | Pyle et al. | |
| 2011/0191593 A1 | 8/2011 | Cheng | |
| 2011/0258345 A1 | 10/2011 | Bhanote | |
| 2012/0047451 A1 | 2/2012 | Marmaros | |
| 2013/0014275 A1 | 1/2013 | Goodes et al. | |
| 2013/0262687 A1 | 10/2013 | Avery et al. | |
| 2013/0326221 A1 | 12/2013 | Murphy et al. | |
| 2013/0332723 A1 | 12/2013 | Tan et al. | |
| 2014/0018048 A1 | 1/2014 | Anand et al. | |
| 2014/0173700 A1 | 6/2014 | Awan et al. | |
| 2014/0282465 A1 | 9/2014 | Matenaar et al. | |
| 2014/0325664 A1* | 10/2014 | Nekhoroshev | G06F 21/52 726/26 |
| 2015/0066859 A1* | 3/2015 | Blake | G06F 11/1438 707/649 |
| 2015/0220541 A1* | 8/2015 | Parameswaran | G06F 17/30371 707/694 |

FOREIGN PATENT DOCUMENTS

| | | |
|---|---|---|
| EP | 1 458 151 A1 | 9/2004 |
| EP | 1 841 174 A1 | 10/2007 |
| EP | 2 692 162 A1 | 2/2014 |
| WO | 97/26731 A1 | 7/1997 |
| WO | 03/102753 A1 | 12/2003 |
| WO | 2007/047183 A2 | 4/2007 |

OTHER PUBLICATIONS https://groups.google.com/forum/#!msg/three20/6mBrQRRWXnU/yxWNZuDrnYOJ; Google Groups on iOS Swizzle; May 11, 2010, 24 pgs.

http://www.consumerizeit.com/blogs/consumerization/archive/2012/06/08/app-wrapping-with-mocana-mobile-app-protection.aspx; Article on Mocana Mobile; Aug. 6, 2012, 2 pgs.

https://apperian.jira.com/wiki/display/pub/Application+Policies#ApplicationPolicies-EncryptedDAR(DataRest); About EASE; Feb. 26, 2013, 10 pgs.

http://www.consumerizeit.com/blogs/consumerization/archive/2012/05/11/citrix-synergy-2012-video-cloudgateway-2-mobile-application-management.aspx; CloudGateway; May 11, 2012, 3 pgs.

http://www.consumerizeit.com/blogs/consumerization/archive/2012/05/11/citrix-synergy-2012-video-a-first-look--at-appsense-rapshere-mobile-app-management-and-app-wrapping.aspx; App Sense RapSphere; May 11, 2012, 3 pgs.

http://blog.iosplace.com/?p=33; ios Place; Oct. 1, 2010, 3 pgs.

http://reverse.put.as/wp-content/uploads/2011/06/mach-o_infection.ppt; Mach-o-infection; "Infecting the Mach-o Object Format," Jun. 2011, 46 pages.

http://stackoverflow.com/questions/8825537/mach-o-symbol-stubs-ios;.stackoverflow; Jan. 11, 2012, 4 pgs.

http://networkpx.blogspot.com/2009/09/about-Icdyldinfoonly-command.html; network px blogspot; Sep. 20, 2009, 6 pgs.

http://www.amazon.com/Mac-OS-Internals-Systems-Approach/dp/0321278542; A. Singh; Mac OS X Internals: A Systems Approach; pp. 61-74; Jun. 29, 2006, Addison-Wesley Professional, Boston, Massachusetts.

http://www.amazon.ca/Hacking-Securing-iOS-Applications-Hijacking/dp/1449318746/ref=pd_bxgy_b_img_b/184-9916216-5442607; J. Zdziarski; Hacking and Securing iOS Applications; Hacking Part-1, pp. 189-202; Hacking Part-2, pp. 149-156 and pp. 203-208; Jan. 25, 2012; O'Reilly Media, Sebastopol, California.

http://books.google.ca/books?id=1kDcjKcz9GwC&printsec=frontcover#v=onepage&q&f=false; Charlie Miller, et al.; iOS Hackers' Handbook, Chapter 4: Code Signing and Memory Protections, pp. 69-105; Google Books; May 8, 2012, John Wiley & Sons, Indianapolis, Indiana.

Huawei AnyOffice Mobile Security Solution, Huawei Technologies Co., Ltd., 2013, http://enterprise.huawei.com/ilink/enenterprise/download/HW_277458.

Mallikarjuna et al., "Unveiling of Android Platform," IJARCSSE, Jul. 2013, vol. 3, Issue 7, pp. 1264-1267, 12 pages, http://www.ijarcsse.com/docs/papers/Volume_3/7_July2013/V3I7-0441.pdf.

FacileLogin, "Landscapes in Mobile Application Security", Oct. 2013, 5 pages, http://blog.facilelogin.com/2013/10/landscapes-in-mobile-application.html.

Elbaz, "Using Public Key Cryptography in Mobile Phones," DISCRETIX Technologies, Oct. 2002, 9 pages, http://dev1.discretix.com/wp-content/uploads/2013/02/Using_Public_Key_Cryptography_in_Mobile_Phones.pdf.

MacNN Forum thread "How to re-sign Apple's applications once they've been modified" Dec. 2, 2007, 4 pages, http://forums.macnn.com/79/developer-center/355720/how-re-sign-apples-applications-once/.

* cited by examiner

```
                    ORIGINAL APPLICATION MANIFEST FILE
                                    202
    <manifest...>
        <application android:name=    "oracle.webcenter.content.android.
                                       WebCenterContentApplication" ...>
            ⋮
ORIGINAL
CONTENT     ⎧   <provider android:name=  "oracle.webcenter.content.android.
PROVIDER    ⎨     ⋮                       documentsprovider.WCCFilesProvider" ...>
CLASS       ⎩
NAME                [original subelements]
204
                ⋮
            </provider>
        </application>
    </manifest>
```

FIG. 2A

```
                    REVISED APPLICATION MANIFEST FILE
                                    206
    <manifest...>
        <application android:name=    "oracle.webcenter.content.android.
                                       WebCenterContentApplication" ...>
            ⋮
RENAMED     ⎧   <provider android:name=  "oracle.webcenter.content.android.
CONTENT     ⎨     ⋮                       documentsprovider.MyC14NWCCFilesProvider"...>
PROVIDER    ⎩
CLASS               <original subelements>
208
                ⋮
            </provider>

NEW         ⎧   <provider android:name =  "oracle.webcenter.content.android.
CONTENT     ⎨                              documentsprovider.WCCFilesProvider"...>
PROVIDER    ⎩
CLASS               [new subelements]
DEFINITION
210             ⋮
            </provider>
        </application>
    </manifest>
```

FIG. 2B

```
                    ORIGINAL BYTE CODE FILE
                              302
                  ⋮
ORIGINAL CLASS  ⎧  class ContentProvider {
    NAME        ⎨      [original code]
    304         ⎩  }
                  ⋮
```

FIG. 3A

```
                    REVISED BYTE CODE FILE
                              306
                  ⋮
                  class MyC14NContentProvider {
                      [original code]
                  }
RENAMED CLASS  ⎧
    208        ⎨  ⋮
               ⎩
                  class ContentProvider {
                      ContentProvider delegate;
                      onCreate(){
NEW CLASS      ⎧      readPolicy();
DEFINITION     ⎨      authenticateBasedOnPolicy();
    210        ⎪      delegate.onCreate();
               ⎪  }
               ⎩  [other methods]
                  }
                  ⋮
```

FIG. 3B

METHOD TO MODIFY ANDROID APPLICATION LIFE CYCLE TO CONTROL ITS EXECUTION IN A CONTAINERIZED WORKSPACE ENVIRONMENT

CROSS-REFERENCES TO RELATED APPLICATIONS

This application claims the benefit of U.S. Provisional Application No. 62/054,853, filed Sep. 24, 2014, which is hereby incorporated by reference in its entirety for all purposes.

This application is related to, but does not claim priority to, U.S. application Ser. No. 13/841,498, now U.S. Pat. No. 9,129,112, filed Mar. 15, 2013, and U.S. application Ser. No. 14/213,244, now co-pending, filed Mar. 14, 2014, which are hereby incorporated by reference in their entireties for all purposes.

BACKGROUND

1. Field of the Art

Generally, the present application relates to data processing. Specifically, the application relates to systems, methods, and machine-readable media for providing security services to software applications on mobile and other devices, including authentication, authorization, auditing, single sign on, security policy enforcement, key management and distribution, secure communication, secure data storage, and secure data sharing, among others.

2. Discussion of the Related Art

Convenient access to enterprise resources on a mobile device is a recurring problem. Once a mobile device management (MDM) solution is installed on a mobile device, just about everything on the mobile device becomes enterprise data. This can be sub-optimal if a user of the mobile device wishes to use it for non-enterprise purposes.

Applications, or "apps" as they are sometimes referred to, are updated and revised frequently. It is not uncommon for an email application to be subject to an update patch every few months. Mobile devices and other computing devices often have many apps, each of which is updated frequently. This can make securing the mobile device from hackers difficult because a computing device is generally only as secure as its weakest link. If one application suffers from a security anomaly, potentially all of the data on the device may be compromised.

Because of these security vulnerabilities, many companies do not allow access by employees' own devices, commonly called bring-your-own-device (BYOD) access, to their corporate networks. Unless the employees consent to the MDM solution described above, which locks down everything on the user's device, corporations have not embraced a BYOD philosophy. An alternative is for employers to provide electronic devices to employees for enterprise access; however, this is costly and requires infrastructure to update.

Better security, flexibility, and integration of apps on mobile devices is needed.

BRIEF SUMMARY

Generally, systems, devices, and methods are described for automatically 'containerizing' a mobile application before installation on a computing device so that all of the application's network calls and input/output (I/O) calls are preceded by necessary user authentication, token selection, and/or encryption. Before any code is executed by the native application in a constructor or network or I/O call, security code is executed.

A 'containerizer' application takes a native, unmodified application as an input and outputs a containerized, modified application. Specifically, an ApplicationManifest.XML file and a Google Dalvik® executable (DEX) byte code file for Google Android® computer applications are extracted from a Google Android® application package (APK) file. Wrapper classes and dummy lifecycle methods are created for the Application, Content Providers, and Activities. One purpose is to create a dummy lifecycle so that no original code is executed until the authentication is done; once authentication is done successfully, policies are fetched and applied before the actual application code is executed.

A life cycle of a mobile device app can be modified. The method decodes an APK file and extracts an Android manifest and DEX file from it. From the manifest it reads the application class name and then parses the byte code of the application class and renames the methods CLINIT (Static Initializer), INIT (Constructor), attachBaseContext, and onCreate (Application Life cycle method) and inserts blank dummy methods with the original name, i.e., CLINIT, INIT, attachBaseContext, and onCreate. After dealing with the application class, it fetches the name of content provider classes from the manifest and modifies those names (in the manifest) with a suffix constant appended. Then using byte code manipulation it creates classes for content providers with modified names which serve as a wrapper/delegate class over the Original Content Provider. Once the wrappers for content providers are generated, it reads the name of activities from the manifest file and using the byte code parser it renames the methods CLINIT, INIT, and lifecycle methods (onCreate, onResume, onStart, onRestart, onPause, onStop, onDestroy, finish) and creates dummy methods in their places. Also, a dummy launcher Activity is added in the DEX file, and its name is added in the manifest file as a launcher activity (removing launcher properties from original launcher activity), which is the first activity to be called when the application is launched. Once the application lifecycle control comes in, dummy launcher activity authentication is triggered and policies are fetched. After that, original launcher activity is invoked.

A purpose of replacing original Lifecycle Methods/Classes with dummy methods/classes is so that no application code is executed before the authentication is done and policies are fetched. A containerizer not only modifies the lifecycle but can also wrap the file system calls and network calls to inject security in those calls. E.g., before writing any data on a device the data will be encrypted and will be decrypted in reading operations. Similarly, all network calls can be proxied through a gateway installed in an enterprise network so that all network traffic can be controlled and routed through a proper channel. To perform network interception it may be important to be authenticated from the network where the traffic is being routed, similarly to the encrypt/decrypt on write/read operations; a key manager should be initialized. Once authentication is done, the key manager can be initialized and an authentication token is received to communicate over the network. The original lifecycle methods/classes which were renamed are triggered is the same sequence. Authentication, in some instances, can only be called once control comes into activity lifecycle, e.g., onCreate/onResume of activity. Therefore, the original life cycle is replaced by a dummy lifecycle. Once authentication happens, the original lifecycle is invoked after the authentication.

When a containerized application is launched, the first thing that happens is initialization of an application class. Since all initialization/lifecycle methods were renamed, none of that code is executed. Instead the dummy methods (injected by containerizer) are executed. After the application class initialization, content providers are initialized and the wrapper classes (injected by containerizer) for the content providers get initialized.

After application and content provider initialization, application lifecycle comes in dummy launcher activity which triggers authentication and upon successful authentication key manager and network manager are initialized. After this, the original lifecycle is triggered. First application's class renamed CLINIT, renamed INIT and renamed attachBaseContext are invoked. After executing renamed lifecycle methods, application class original content provider classes are initialized and their onCreate is invoked. Once Original Content Providers get initialized, Application's class original onCreate is invoked. Once all this is done, Original Launcher Activity is invoked and the rest of the application functions accordingly.

Sometimes an application can be triggered on some specific activity, in which after the application class and ContentProvider Initialization control does not come in dummy launcher activity but goes directly into the called activity. For this reason we had renamed Static initializer (CLINIT), Constructor (INIT), and lifecycle methods in activity, and added dummy methods for Activity Life cycle in all activities. These dummy methods check for authentication before invoking original renamed lifecycle methods. If not authenticated, the dummy methods of onCreate/onResume trigger authentication. Upon successful authentication, original life cycle for application and content provider initialization is triggered. After this original CLINIT, INIT, and onCreate of the activity are invoked and then the rest of the application flow goes accordingly.

Some embodiments of the present invention are related to a method of modifying a life cycle of a mobile device app. The method includes providing an application manifest file and a byte code file, the application manifest file and byte code file corresponding to a computer software application, renaming an original method of an application class to a renamed method in the byte code file, inserting a wrapper method in the application class in the byte code file, the wrapper method having a name of the original method, the wrapper method configured to call an authentication or encryption method before calling the renamed method, modifying a name of an original content provider class to a modified content provider class name in the application manifest file, and creating a wrapper content provider class in the byte code file, the wrapper content provider class having the modified content provider class name, the wrapper content provider class configured to check whether the original content provider class is instantiated before forwarding a call to a method of the original content provider class.

The method can further include renaming a name of an original method of an activity class to a renamed method of the activity class in the byte code file, and inserting a dummy method in the activity class in the byte code file, the dummy method having a name of the original method of the activity class, the dummy method configured to call an authentication or encryption method before calling the renamed method of the activity class.

All content provider class names in the application manifest file can be renamed. The method can further include reading a policy by the wrapper method, wherein the call to the authentication or encryption method is based on the policy. The policy can be sent to a mobile device upon which the mobile device app is installed from an information technology (IT) department.

The wrapper method can include a call to a mobile device manager application. The original method can include a static block initialization. The original method can include a constructor. The method can further include renaming an application static initialization method, an application constructor method, an application attachBaseContext( ) method, a content provider static initialization method, a content provider constructor method, a content provider onCreate( ) method, an application onCreate( ) method, a launcher activity static initialization method, a launcher activity constructor method, and launcher activity onCreate( ), onStart( ), and onResume( ) methods in the byte code file.

The method can further include inserting an onCreate( ), onStart( ), onStop( ), onRestart( ), onPause( ), onResume( ), or onDestroy( ) method into the wrapper class. The renaming of the original method can include appending a prefix or suffix to the original method to create the renamed method. The application manifest file can include extensible markup language (XML) code. The byte code file can be a Google Dalvik® executable (DEX) byte code file for Google Android® computer applications. The method can further include extracting the application manifest file and the byte code file from a Google Android® application package (APK) file.

Yet other embodiments relate to systems executing the above-referenced methods and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

FIGS. 2A-2B illustrate revising an application manifest file in accordance with an embodiment.

FIGS. 3A-3B illustrate revising a byte code file in accordance with an embodiment.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Aspects of the invention are directed toward how to perform secure containerization on a Google Android® operating system (OS)-based device. How a containerization goal is achieved on an Android platform is described. It defines a procedure of how to intercept an Android application life cycle and perform injections to achieve the desired goal.

Containerization is a novel approach to secure mobile apps. One can provide a secure workspace and integrate other apps around it so they share an eco system of a containerized environment along with the workspace.

Prior industry solutions simply installed an MDM on a mobile device; after that, the device effectively becomes the property of the enterprise. Even personal apps become subject to enterprise policies.

With a mobile workspace solution such as one described herein, personal data and enterprise data can remain under separate control. Enterprise apps and their data, which work in a containerized environment, remain under the control of company policies. Their network access and file system access is secured in a common fashion across the containerized environment.

Technical advantages of such a mobile workspace solution are that it can:
 add security to the mobile app;
 provide secure network and file access;
 provide authenticated access to app;
 provide policy control over the apps;
 provide data leakage protection; and
 provide control over a containerized environment on a device, which could be locked/wiped/cleaned from the admin console without touching the personal data on device.

Approach

A general lifecycle of a Google Android® application typically includes the following:
 Application Class Initialization
 Static Initialization
 Constructor Initialization
 attachBaseContext( ) Application Lifecycle initialization
 Content Providers
 Static Initialization
 Constructor Initialization
 onCreate( ) Content Provider Life cycle initialization
 onCreate( ) Application Lifecycle Initialization
 Launcher Activity Initialization
 Static Initialization
 Constructor initialization
 onCreate( ), onStart( ), onResume( ) Activity Lifecycle Initialization One can alter this lifecycle in order to force every network and I/O call from an application to check a security policy and/or run a security check beforehand.

Figure 1:
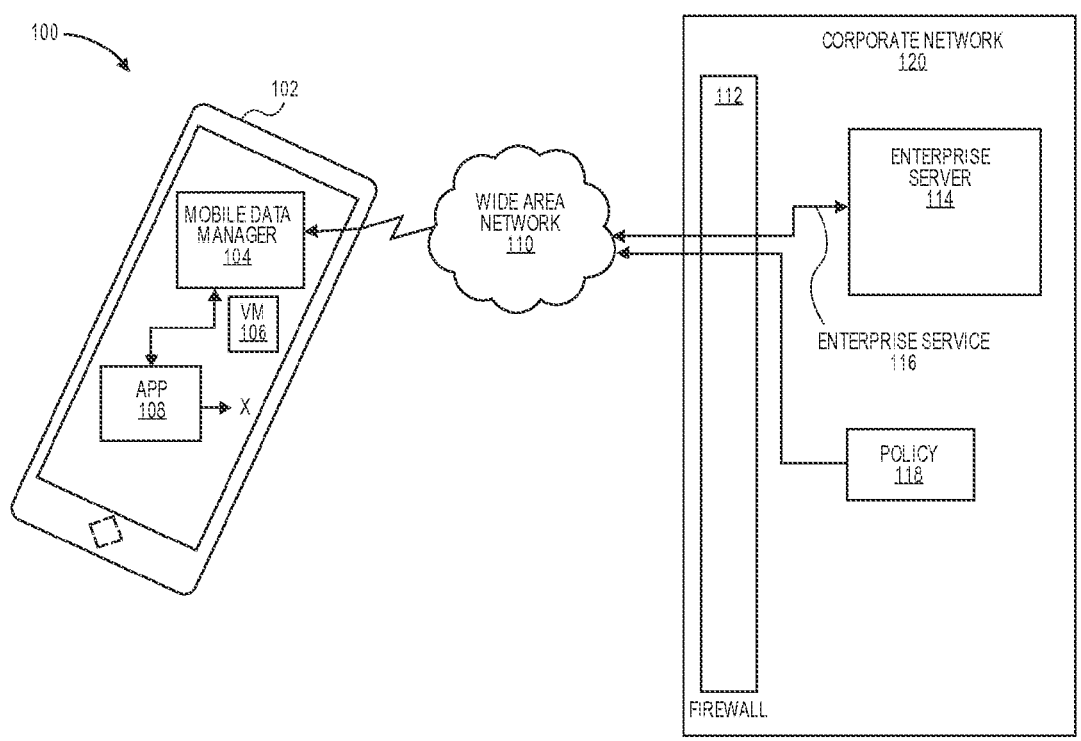
FIG. 1 illustrates a mobile device connecting to a protected corporate network in accordance with an embodiment.

FIG. 1 illustrates a mobile device connecting to a protected corporate network in accordance with an embodiment. In system 100, smart phone 102 communicates over wide area network 110 with corporate network 120.

In smart phone 102, app 108, which runs on Dalvik® virtual machine (VM) 106, is denied a direct connection with external entities. Instead, wrappers around key constructors and initializations force network calls to go through mobile data manager (MDM) 104. Mobile data manager 104 can check authentication tokens and other security-related aspects of the device's communications. App 108 effectively communicates through mobile data manager 104 to wide area network 110, such as the Internet, with corporate network 120.

On corporate network 120, all incoming and outgoing network traffic is checked and regulated by firewall 112. Calls to enterprise server 114 from mobile device 102 can take the form of enterprise web service 116. For example, app 108 may tap into internal employee records, which are provided by enterprise service 116.

The company's IT department may promulgate policy 118, a copy of which is sent through wide area network 110 to mobile device 102. The copy of the policy, which may take the form of an extensible markup language (XML) file, may be consulted by the wrapper classes in app 108 in order to determine if and when to acquire security certificates, etc. for certain transactions.

FIGS. 2A-2B illustrate revising an application manifest file in accordance with an embodiment. In FIG. 2A, original application manifest file 202 has an original class name 204, "oracle.webcenter.content.android.documentsprovider.WCCFilesProvider". Within the elements named by this class name are original subelements.

In FIG. 2B, revised application manifest file 206 is shown to have original class name 204 renamed to a renamed class name with a "MyC14N" prefix. That is, it is renamed to "oracle.webcenter.content.android.documentsprovider.MyC14NWCCFilesProvider". Further new class definition 210 is added with the same class name as the original class name, namely "oracle.webcenter.content.android.documentsprovider.WCCFilesProvider". Under the new class definition are new subelements. The new subelements may or may not be copies of the original subelements. Some subelements may be deleted.

FIGS. 3A-3B illustrate revising a byte code file in accordance with an embodiment.

In FIG. 3A, original byte code file 302 has an original class 304, "ContentProvider". Within the class is original code.

In FIG. 3B, revised type code file 306 is shown to have original class name renamed to a renamed class with a "MyC14N" prefix. That is, it is renamed to "MyC14NContentProvider". Its original code remains the same.

New class 310 is added with the same name as the original class, "ContentProvider." This new class defines a variable to check whether it has been instantiated and initialized or not. It also creates wrapper methods, such as onCreate( ), which read a policy, authenticate, encrypt/decrypt or perform other security functions based on the policy, and then call the original onCreate( ) function of the original class.

Figure 4:
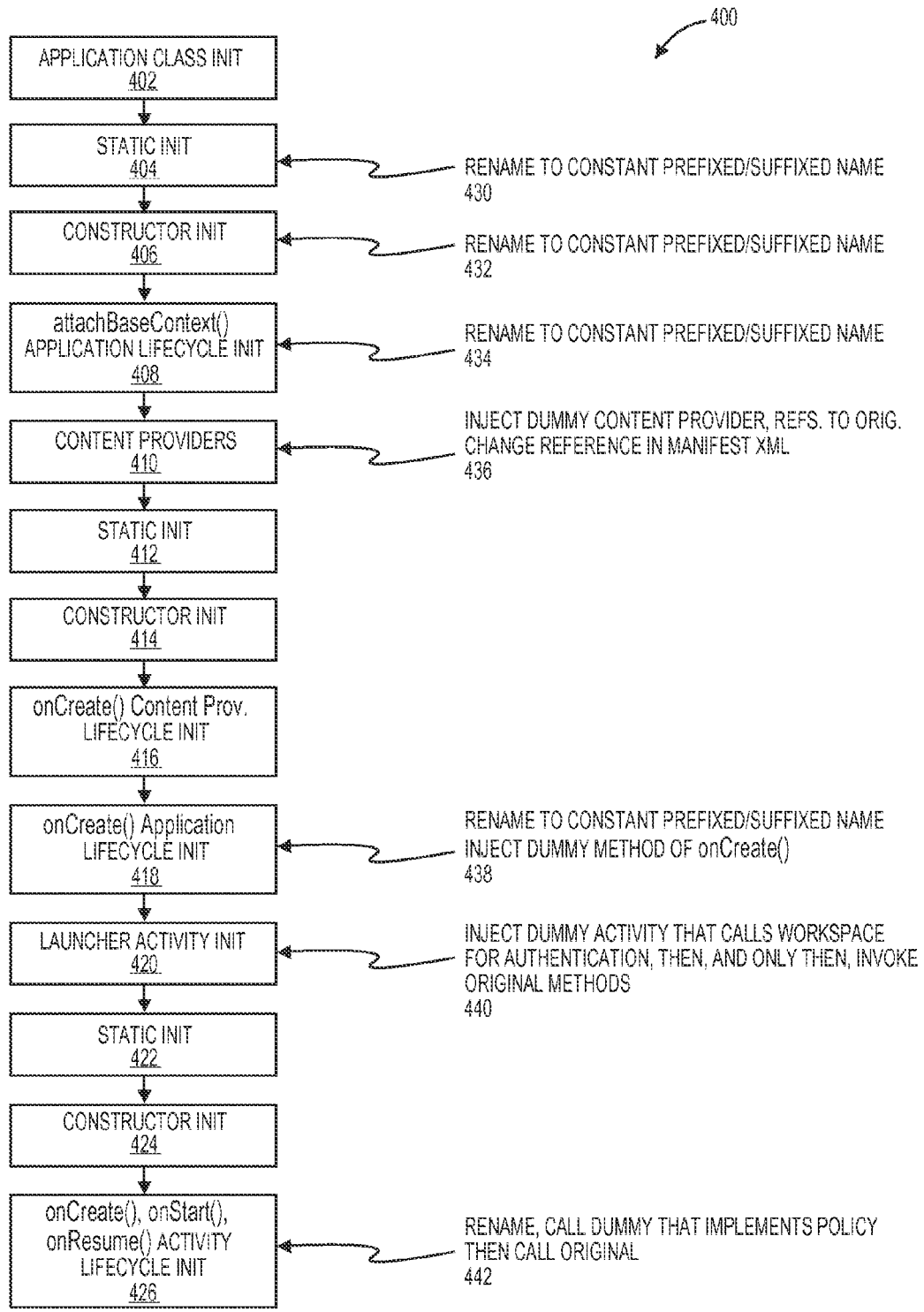
FIG. 4 illustrates a modification of an application lifecycle in accordance with an embodiment.

FIG. 4 shows a byte code manipulation/injection for interception of execution of application code that can be employed. For every possible network and file system operation, one can create a wrapper class that is injected into the existing application. One can implement the actual byte code modification in the existing code, replacing the original classes with wrapper classes. For example:
 Once can replace FileInputStream and FileOutputStream with custom wrapper classes.

Since one may wish to control the application life cycle, a byte code manipulation approach to inject/modify existing life cycle code can be used.

One purpose for using this approach is to get the user authenticated before the user is allowed to execute the application and to fetch the session data and encryption keys from the secure workspace after the authentication. Thus, the network calls and file system calls can actually work. Some wrappers need a master encryption key to decode the encryption key, which is used to encrypt/decrypt data in every file operation. Also, for a network call, the session token can be required to establish the authenticity of a call made to any network resource, which can be routed via the Oracle mobile security gateway or other cloud-based gateway.

To achieve the above use case, one can delay the entire application lifecycle and introduce a dummy lifecycle so that the user could be authenticated first and then fetch the master encryption key and session token.

Here is a step-by-step list in an application lifecycle in accordance with an embodiment.

Application Class initialization occurs in operation 402.

For static initialization 404, it is renamed in containerization step 430 to a custom defined, constant prefixed/suffixed name so it can be invoked later and injected a empty class initializer For constructor initialization 406, it is renamed in containerization step 432 to a custom defined, constant prefixed/suffixed name so it can be invoked later and injected a empty class constructor. This can be done with all the available constructors. It can be done to all the constructors of the super class, and their respective super( ), invocation can also be changed to the custom name mentioned above.

Method attachBaseContext( ), 408 can be renamed in operation 434 to a custom defined, constant prefixed/suffixed name so it can be invoked later and injected an empty method for it.

For content provider initialization 410, one can inject a dummy content provider for each content provider defined in the application and also change the reference in the associated manifest XML (extensible markup language) in operation 436. These dummy content providers in turn contain a reference to the original content provider, and all the method calls on this dummy content provider are delegated to the original content provider. Content providers are typically not normally initialized until a first call is made to any interface method. Or one can simply say that it was a lazy initialization. For example, if content provider is MyContentProvider than one can implement the following:

Change the entry in Manifest <provider android: name="MyContentProvider"> to <provider android: name="MyC14NContentProvider">

Injected a class called MyC14NContentProvider with static init 412 and constructor init 414.

```
class MyC14NContentProvider{
    Content Provider delegate;
    onCreate( ){
        //Nothing
    }
    insert ( ) {
        checkInit( )
        delegate.insert( );
    }
    query ( ) {
        checkInit( );
        delegate.query( )
    }
    checkInit( ){
        if(delegate == null){
            delegate = new MyContentProvider( );
            delegate.setContext(getContext( ));
            delegate.onCreate( );
        }
    }
    ...
```

In this way, the initialization of the content provider is delayed by introducing dummy content providers and delegating their interface methods to original methods of original classes.

For application onCreate( ) initialization 416, the containerizer can perform the following operations.

The onCreate( ) method can be renamed in operation 438 to a custom defined, constant prefixed/suffixed name so that it could be invoked later and in turn injected a dummy method of onCreate( ) This is done for all super classes, and invocation of super.onCreate( ) can be delegated to the renamed onCreate( ) method mentioned above.

For activity lifecycle initialization, such as for launcher activity initi 420, one can inject a dummy activity in operation 440, make it as a launcher activity, and remove the launcher action from the original activity. Once one acquires control in a dummy activity, one can call the workspace for authentication, which would return a session token and master encryption key. Once one acquires the key, one can reinitialize the whole cycle by invoking the original methods which were renamed.

Original application class static initializer 422 can be called.

Original application class constructor 424 can then be called.

Original application class attachBaseContext( ) may be called.

Init( ) can be called on dummy content providers, which will initialize the original content providers.

Original application class onCreate( ) can be called.

Similarly, one can inject/modify lifecycle of original existing activities

One can rename onCreate( ), onRestart( ), onResume( ) methods of 426 in operation 442 and inject custom-defined lifecycle methods, where one will do the task of policy implementations and then invoke the original renamed method afterwards. For example:

onCreate( ) renamed to onCreate_C14N( )

inject our own onCreate( )

onCreate{
  // do our Custom tasks for policy and data check
    onCreate_C14N( )
}

Similarly, this can be performed for other Life cycle methods onStart( ), onResume( ), onPause( ), onStop( ), onDestroy( )

Using the same approach of byte code modification/injection, one can replace the system calls of shared preferences and startActivity( ) with one's own custom calls, where one can perform all encryption/decryption and check for policies, and then invoke the original operation.

Figure 5:
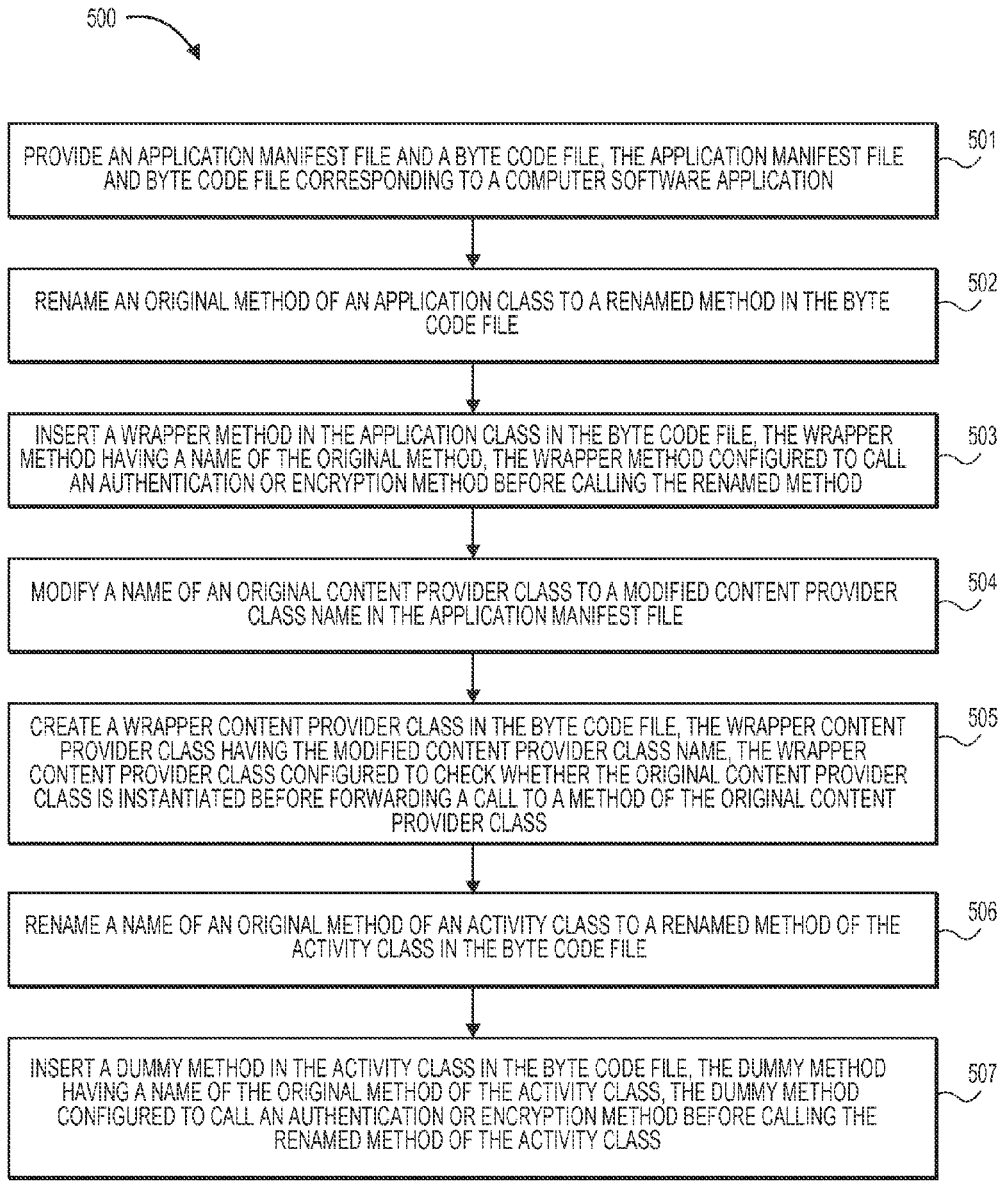
FIG. 5 is a flowchart illustrating a process in accordance with an embodiment.

FIG. 5 is a flowchart illustrating process 500 in accordance with an embodiment. The process can be implemented by computer by executing instructions in a processor or otherwise. In operation 501, an application manifest file and byte code file are provided, the application manifest file and byte code file corresponding to a computer software application. In operation 502, an original method of an application class is renamed to a renamed method in the byte code file. In operation 503, a wrapper method is inserted in the application class in the byte code file, the wrapper method having a name of the original method, the wrapper method configured to call an authentication or encryption method before calling the renamed method. In operation 504, a name of an original content provider class is modified to a modified content provider class name in the application manifest file. In operation 505, a wrapper content provider class is created in the byte code file, the wrapper content provider class having the modified content provider class name, the wrapper content provider class configured to check whether the original content provider class is instantiated before forwarding a call to a method of the original provider class.

In operation 506, a name of an original method of an activity class is renamed to a renamed method of the activity class in the byte code file. In operation 507, a dummy method is inserted in the activity class in the byte code file, the dummy method having a name of the original method of the activity class, the dummy method configured to call an authentication or encryption method before calling the renamed method of the activity class.

Computer System Infrastructure

Figure 6:
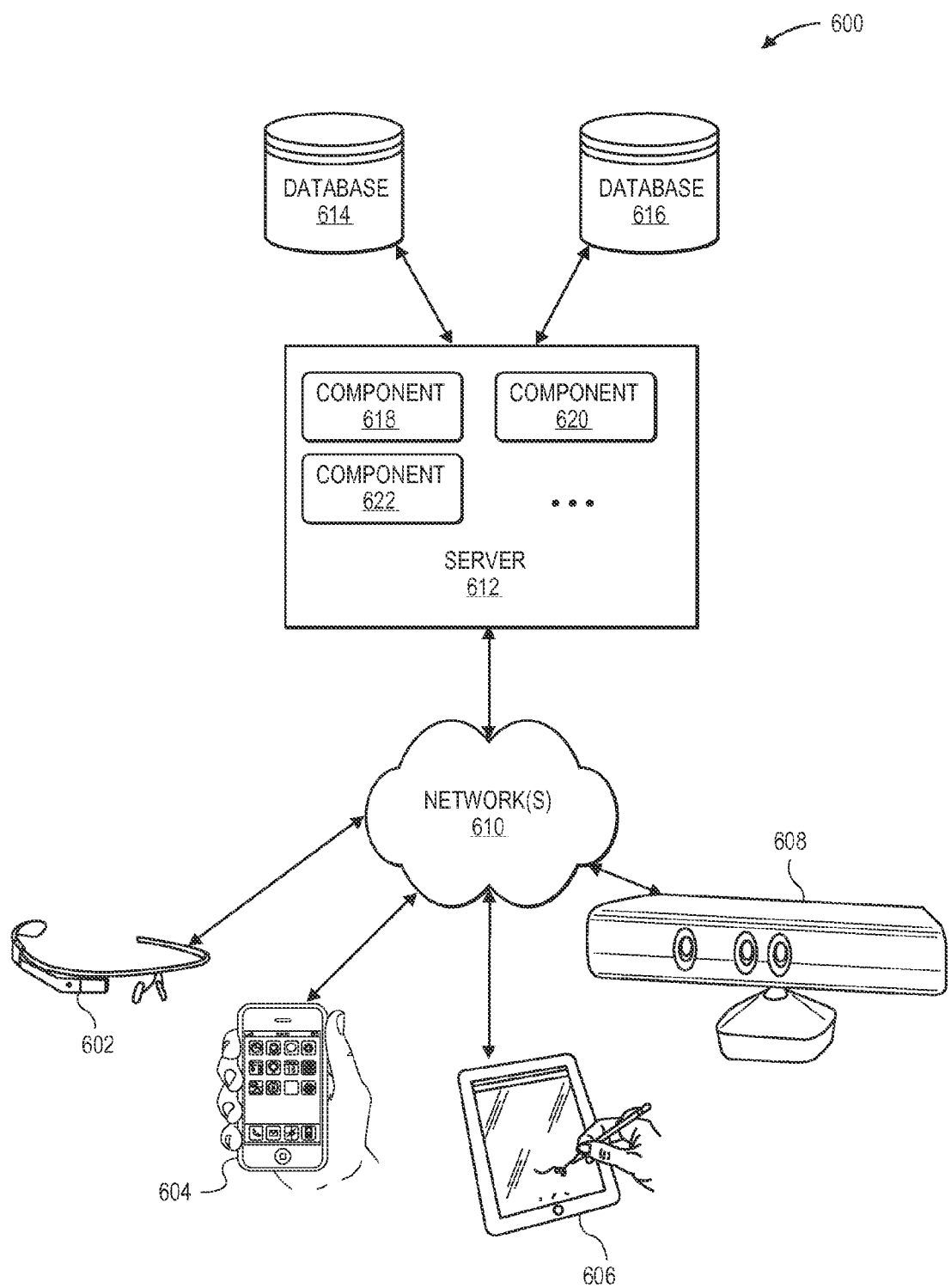
FIG. 6 depicts a simplified diagram of a networked system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
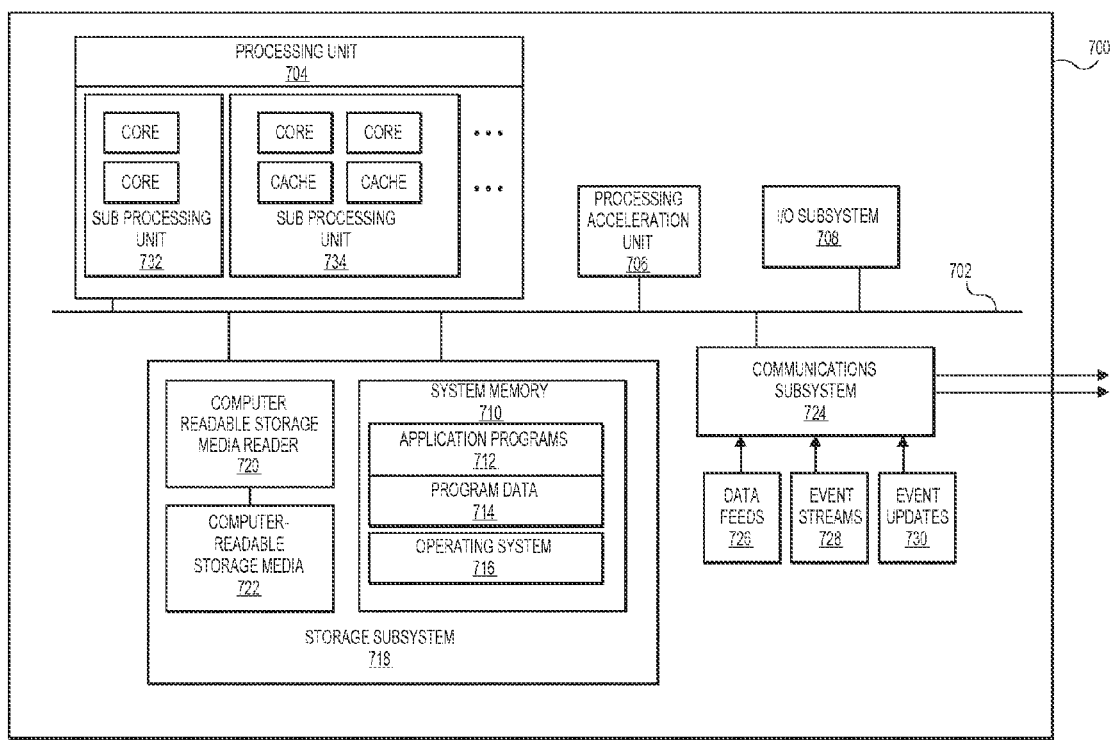
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of modifying a life cycle of a mobile device app, the method comprising:
   providing an application manifest file and a byte code file, the application manifest file and byte code file corresponding to a computer software application;
   renaming an original method of an application class to a renamed method in the byte code file;
   inserting a wrapper method in the application class in the byte code file, the wrapper method having a name of the original method, the wrapper method configured to call an authentication or encryption method before calling the renamed method;
   modifying, by a processor, a name of an original content provider class to a modified content provider class name in the application manifest file;
   creating a wrapper content provider class in the byte code file, the wrapper content provider class having the modified content provider class name, the wrapper content provider class configured to check whether the original content provider class is instantiated before forwarding a call to a method of the original content provider class;
   renaming a name of an original method of an activity class to a renamed method of the activity class in the byte code file; and
   inserting a dummy method in the activity class in the byte code file, the dummy method having a name of the original method of the activity class, the dummy method configured to call an authentication or encryption method before calling the renamed method of the activity class.

2. The method of claim 1 wherein all content provider class names in the application manifest file are renamed.

3. The method of claim 1 further comprising:
   reading a policy by the wrapper method, wherein the call to the authentication or encryption method is based on the policy.

4. The method of claim 3 wherein the policy is sent to a mobile device upon which the mobile device app is installed from an information technology (IT) department.

5. The method of claim 1 wherein the wrapper method includes a call to a mobile device manager application.

6. The method of claim 1 wherein the original method includes a static block initialization.

7. The method of claim 1 wherein the original method includes a constructor.

8. The method of claim 7 further comprising:
   renaming an application static initialization method, an application constructor method, an application attachBaseContext( ) method, a content provider static initialization method, a content provider constructor method, a content provider onCreate( ) method, an application onCreate( ) method, a launcher activity static initialization method, a launcher activity constructor method, and launcher activity onCreate( ), onStart( ), and onResume( ) methods in the byte code file.

9. The method of claim 1 further comprising:
   inserting an onCreate( ), onStart( ), onStop( ), onRestart( ), onPause( ), onResume( ), or onDestroy( ) method into the wrapper class.

10. The method of claim 1 wherein the renaming of the original method includes appending a prefix or suffix to the original method to create the renamed method.

11. The method of claim 1 wherein the application manifest file includes extensible markup language (XML) code.

12. The method of claim 1 wherein the byte code file is a Google Dalvik® executable (DEX) byte code file for Google Android® computer applications.

13. The method of claim 1 further comprising:
   extracting the application manifest file and the byte code file from a Google Android® application package (APK) file.

14. A machine-readable non-transitory medium embodying information indicative of instructions for causing one or more machines to perform operations for modifying a life cycle of a mobile device app, the operations comprising:
   providing an application manifest file and a byte code file, the application manifest file and byte code file corresponding to a computer software application;
   renaming an original method of an application class to a renamed method in the byte code file;
   inserting a wrapper method in the application class in the byte code file, the wrapper method having a name of the original method, the wrapper method configured to call an authentication or encryption method before calling the renamed method;
   modifying, by a processor, a name of an original content provider class to a modified content provider class name in the application manifest file;
   creating a wrapper content provider class in the byte code file, the wrapper content provider class having the modified content provider class name, the wrapper content provider class configured to check whether the original content provider class is instantiated before forwarding a call to a method of the original content provider class;
   renaming a name of an original method of an activity class to a renamed method of the activity class in the byte code file;
   inserting a dummy method in the activity class in the byte code file, the dummy method having a name of the original method of the activity class, the dummy method configured to call an authentication or encryption method before calling the renamed method of the activity class.

15. The medium of claim 14 wherein all content provider class names in the application manifest file are renamed.

16. A computer system for modifying a life cycle of a mobile device app, the system comprising:
   a processor, and
   a memory operatively coupled with the processor, the processor executing instructions from the memory comprising:
      program code for providing an application manifest file and a byte code file, the application manifest file and byte code file corresponding to a computer software application;
      program code for renaming an original method of an application class to a renamed method in the byte code file;
      program code for inserting a wrapper method in the application class in the byte code file, the wrapper method having a name of the original method, the wrapper method configured to call an authentication or encryption method before calling the renamed method;

program code for modifying a name of an original content provider class to a modified content provider class name in the application manifest file;

program code for creating a wrapper content provider class in the byte code file, the wrapper content provider class having the modified content provider class name, the wrapper content provider class configured to check whether the original content provider class is instantiated before forwarding a call to a method of the original content provider class;

program code for renaming a name of an original method of an activity class to a renamed method of the activity class in the byte code file; and program code for inserting a dummy method in the activity class in the byte code file, the dummy method having a name of the original method of the activity class, the dummy method configured to call an authentication or encryption method before calling the renamed method of the activity class.

17. The system of claim 16 wherein all content provider class names in the application manifest file are renamed.

18. The system of claim 16 wherein the processor executes instructions further comprising:

reading a policy by the wrapper method, wherein the call to the authentication or encryption method is based on the policy.

19. The system of claim 18 wherein the policy is sent to a mobile device upon which the mobile device app is installed from an information technology (IT) department.

20. The system of claim 16 wherein the wrapper method includes a call to a mobile device manager application.

* * * * *